(12) United States Patent  (10) Patent No.: US 7,929,041 B2
Okabe  (45) Date of Patent: Apr. 19, 2011

(54) IMAGE PICKUP DEVICE

(75) Inventor: Satoshi Okabe, Tokyo (JP)

(73) Assignee: Olympus Corporation, Tokyo (JP)

( * ) Notice: Subject to any disclaimer, the term of this patent is extended or adjusted under 35 U.S.C. 154(b) by 522 days.

(21) Appl. No.: 12/130,317

(22) Filed: May 30, 2008

(65) Prior Publication Data

US 2008/0297647 A1  Dec. 4, 2008

(30) Foreign Application Priority Data

Jun. 4, 2007 (JP) .................... 2007-147946

(51) Int. Cl.
H04N 5/225 (2006.01)
(52) U.S. Cl. ......... 348/340; 348/342; 348/360; 348/361
(58) Field of Classification Search .................. 348/268, 348/269, 361
See application file for complete search history.

(56) References Cited

U.S. PATENT DOCUMENTS

| | | | | |
|---|---|---|---|---|
| 4,805,028 A * | 2/1989 | Nishioka et al. | ............... | 348/342 |
| 4,859,063 A * | 8/1989 | Fay et al. | ............... | 356/418 |
| 4,882,619 A * | 11/1989 | Hasegawa et al. | ............... | 348/337 |
| 4,967,281 A * | 10/1990 | Takada | ............... | 348/361 |
| 5,003,399 A * | 3/1991 | Ishimaru et al. | ............... | 348/361 |
| 5,016,091 A * | 5/1991 | Choi | ............... | 348/224.1 |
| 5,406,331 A * | 4/1995 | Barrett | ............... | 348/268 |
| 5,548,333 A * | 8/1996 | Shibazaki et al. | ............... | 348/270 |
| 5,654,756 A * | 8/1997 | Takahashi et al. | ............... | 348/268 |
| 5,664,243 A * | 9/1997 | Okada et al. | ............... | 396/246 |
| 5,712,700 A * | 1/1998 | Nagaishi et al. | ............... | 355/35 |
| 5,751,353 A * | 5/1998 | Tanaka et al. | ............... | 348/335 |
| 5,794,090 A * | 8/1998 | Oshima et al. | ............... | 396/435 |
| 5,995,136 A * | 11/1999 | Hattori et al. | ............... | 348/70 |
| 6,157,781 A | 12/2000 | Konno et al. | | |
| 6,754,008 B1 * | 6/2004 | Wallerstein et al. | ............... | 359/672 |
| 7,133,608 B1 * | 11/2006 | Nagata et al. | ............... | 396/374 |
| 7,460,167 B2 * | 12/2008 | Schoonmaker et al. | ............... | 348/360 |
| 2002/0097486 A1 * | 7/2002 | Yamaguchi et al. | ............... | 359/380 |
| 2004/0066495 A1 * | 4/2004 | Yu et al. | ............... | 353/84 |
| 2005/0052734 A1 * | 3/2005 | Kawanabe et al. | ............... | 359/385 |
| 2007/0229683 A1 * | 10/2007 | Larson et al. | ............... | 348/269 |

FOREIGN PATENT DOCUMENTS

JP   06222269 A * 8/1994
JP   9-318993    12/1997

* cited by examiner

Primary Examiner — David L Ometz
Assistant Examiner — Angel L Garces-Rivera
(74) Attorney, Agent, or Firm — Volpe and Koenig P.C.

(57) ABSTRACT

An image pickup device that picks up an image of an object with an image pickup element, consisting of: a lens connecting portion that connects an interchangeable lens that can be attached and detached; a lens distinguishing portion that distinguishes the type of the interchangeable lens that is connected to the lens connecting portion; a plurality of optical filters that are capable of being disposed to the optical rear side of the interchangeable lens in the image pickup optical path when picking up an image of an object on an image pickup element with the interchangeable lens; and a moving portion that moves at least any of the plurality of optical filters to a position that corresponds to the type of the interchangeable lens that the lens distinguishing portion has distinguished.

13 Claims, 13 Drawing Sheets

IMAGE PICKUP DEVICE

BACKGROUND OF THE INVENTION

1. Field of the Invention

The present invention relates to an image pickup device that allows attaching and detaching of an interchangeable lens and has an optical filter.

Priority is claimed on Japanese Patent Application No. 2007-147946, filed Jun. 4, 2007, the content of which is incorporated herein by reference.

2. Description of Related Art

In recent years, there has been a trend of replacing film image pickup devices with digital image pickup devices. An optical low-pass filter is required for a digital image pickup device, and moreover an image pickup device is desired that houses two turrets that provide a plurality of types of neutral density (ND) filters and color compensating (CC) filters for enhancing convenience and maneuverability. On the other hand, in the case of using a lens for a conventional film image pickup device in a digital image pickup device, since many optical glass components (including crystal etc.) exist between the image sensor and the lens in a digital image pickup device, optical aberration occurs, leading to a decrease in image quality.

Japanese Unexamined Patent Application No. H09-318993 discloses a camera system that provides an optical filter member for a solid-state image pickup element in an interchangeable lens for image pickup. This camera system enables the use of an optical filter member for a solid-state image pickup element without altering the structure of a conventional single lens reflex image pickup device using silver-halide film, and can avoid the occurrence of such phenomenon as moire patterns and false color characteristic of a solid-state image pickup element. Also, since optical filter members are constituted to be freely detachable, it is possible to freely select between use/non-use of an optical filter member and the type thereof in accordance with various imaging situations such as situations in which a moire pattern and false color easily occur and situations of wanting to make image quality the highest priority.

SUMMARY OF THE INVENTION

The present invention relates to an image pickup device that picks up an image of an object with an image pickup element, including a lens connecting portion that connects an interchangeable lens that can be attached and detached; a lens distinguishing portion that distinguishes the type of the interchangeable lens that is connected to the lens connecting portion; a plurality of optical filters that are capable of being disposed to the optical rear side of the interchangeable lens in the image pickup optical path when picking up an image of an object on the image pickup element with the interchangeable lens; and a moving portion that moves at least any of the plurality of optical filters to a position that corresponds to the type of the interchangeable lens that the lens distinguishing portion has distinguished.

In the image pickup device of the present invention, it is preferable that the plurality of optical filters be disposed in a disk-shaped rotating turret.

In the image pickup device of the present invention, it is preferable that the rotating turret have an opening portion.

In the image pickup device of the present invention, it is preferable that a plurality of neutral density filters with different transmittances be disposed at other than the opening portion of the rotating turret.

In the image pickup device of the present invention, it is preferable that the optical path lengths of the plurality of neutral density filters be all equal.

In the image pickup device of the present invention, it is preferable that a plurality of color compensating filters with different color temperatures be disposed at other than the opening portion of the rotating turret.

In the image pickup device of the present invention, it is preferable that the optical path lengths of the plurality of color compensating filters be all equal.

In the image pickup device of the present invention, it is preferable that the moving portion rotate the rotating turret so that the opening portion is disposed in the image pickup optical path when the lens distinguishing portion distinguishes the type of the interchangeable lens to be an interchangeable lens for a film image pickup device, and rotate the rotating turret so that any of the plurality of optical filters is disposed in the image pickup optical path when the lens distinguishing portion distinguishes the type of the interchangeable lens to be an interchangeable lens for a digital image pickup device.

In the image pickup device of the present invention, it is preferable that it further include a device state distinguishing portion that distinguishes whether the state of the image pickup device is set to ON or OFF, and the moving portion rotates the rotating turret so that any of the plurality of optical filters is disposed in the image pickup optical path when the device state distinguishing portion distinguishes that the state of the image pickup device has been set to OFF.

The image pickup device of the present invention preferably further includes a display portion that displays information of the optical filter that is disposed in the image pickup optical path.

The image pickup device of the present invention preferably further includes a warning portion that issues a warning when the optical filter that is disposed in the image pickup optical path does not correspond to the type of the interchangeable lens that the lens distinguishing portion has distinguished.

The image pickup device of the present invention preferably further includes an IR-cut filter that blocks an opening of the lens connecting portion.

In the image pickup device of the present invention, it is preferable that a correcting lens be additionally disposed in the rotating turret.

BRIEF DESCRIPTION OF THE DRAWINGS

FIG. 13 is a perspective view that shows the constitution of the filter turret that the image pickup device according to the sixth embodiment of the present invention is provided with.

DETAILED DESCRIPTION OF THE INVENTION

Hereinbelow, the embodiments of the present invention shall be described with reference to the drawings.

First Embodiment

Figure 1:
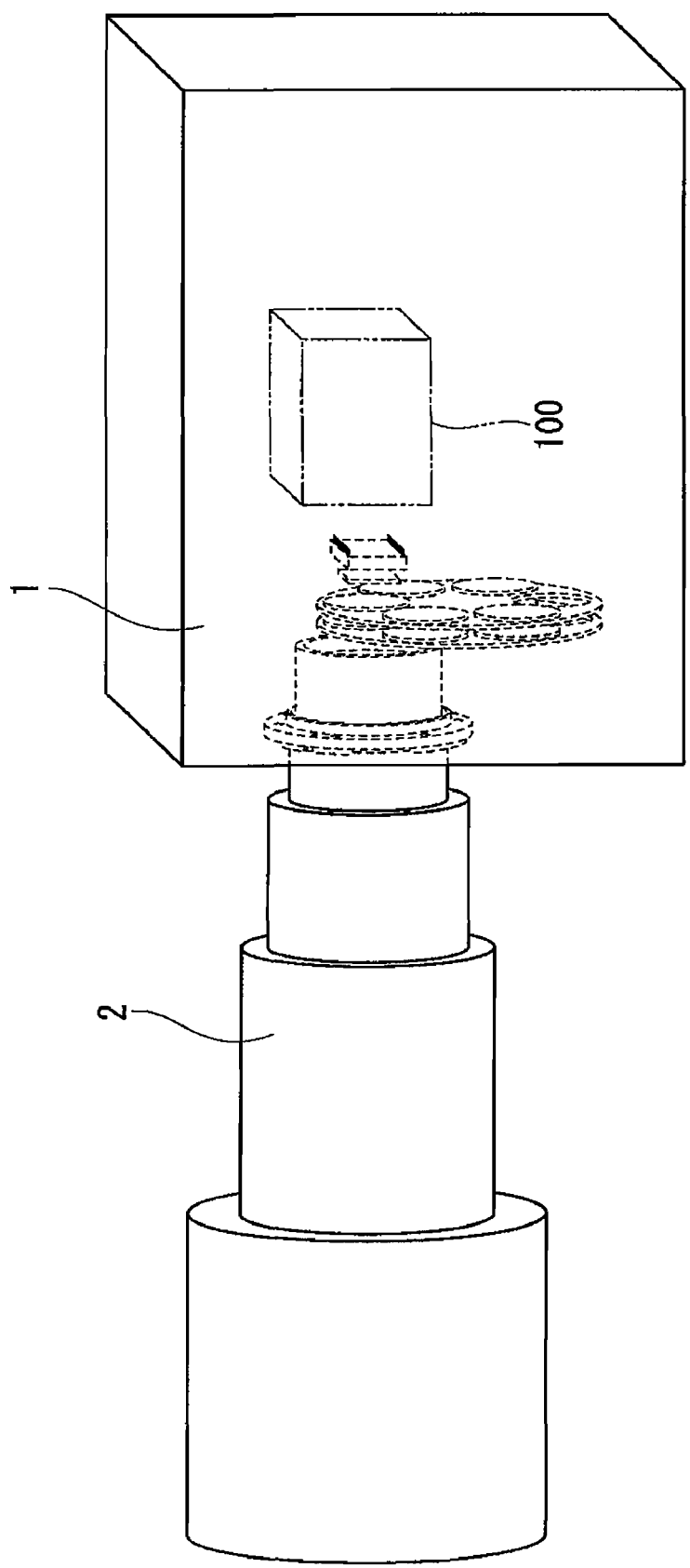
FIG. 1 is a perspective view that shows the entire constitution of the image pickup device according to a first embodiment of the present invention.
Figure 2:
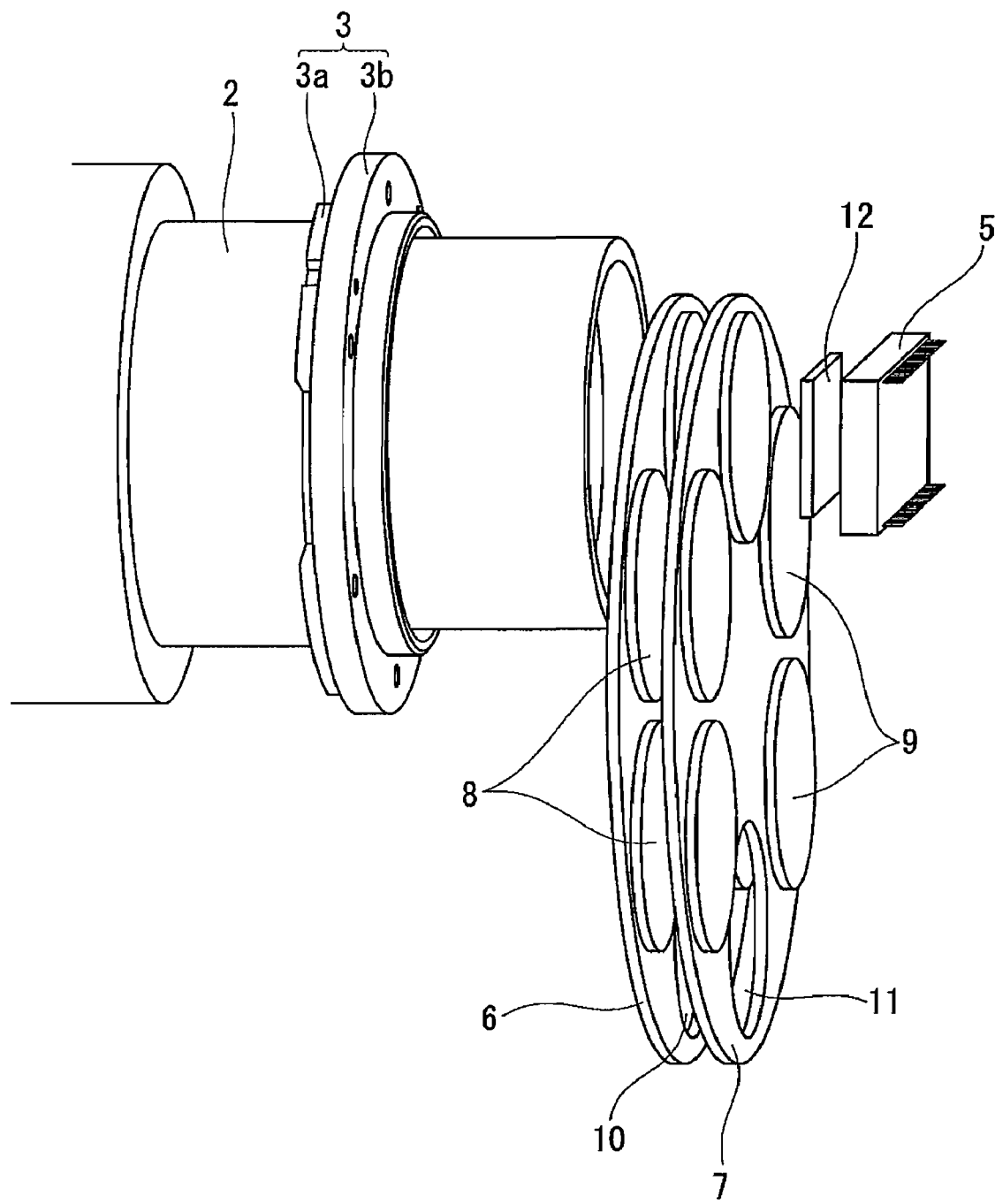
FIG. 2 is a perspective view that shows the constitution of the main portions of the image pickup device according to the first embodiment of the present invention.
Figure 3:
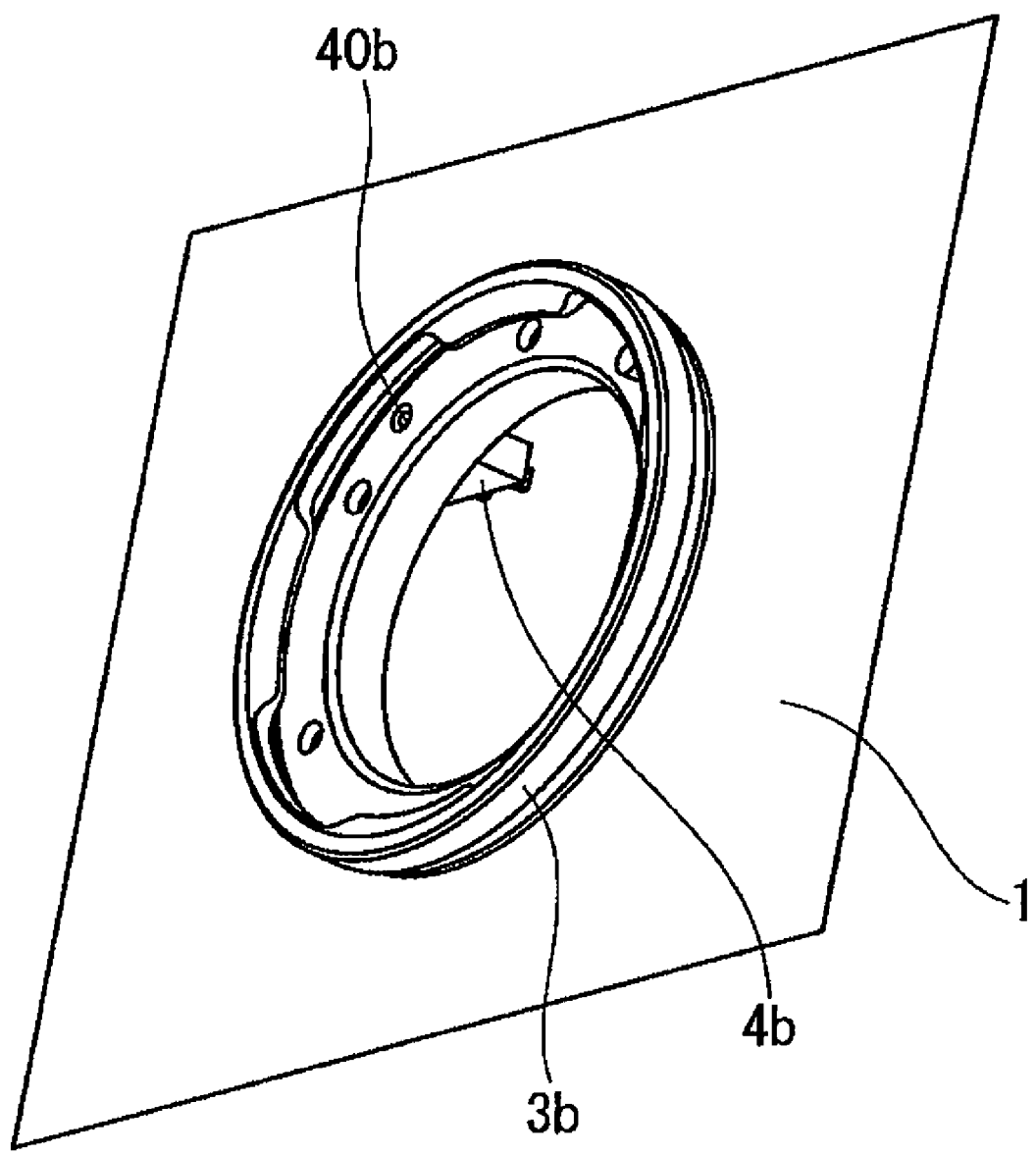
FIG. 3 is a perspective view that shows the constitution of the main portions of the image pickup device according to the first embodiment of the present invention.
Figure 4:
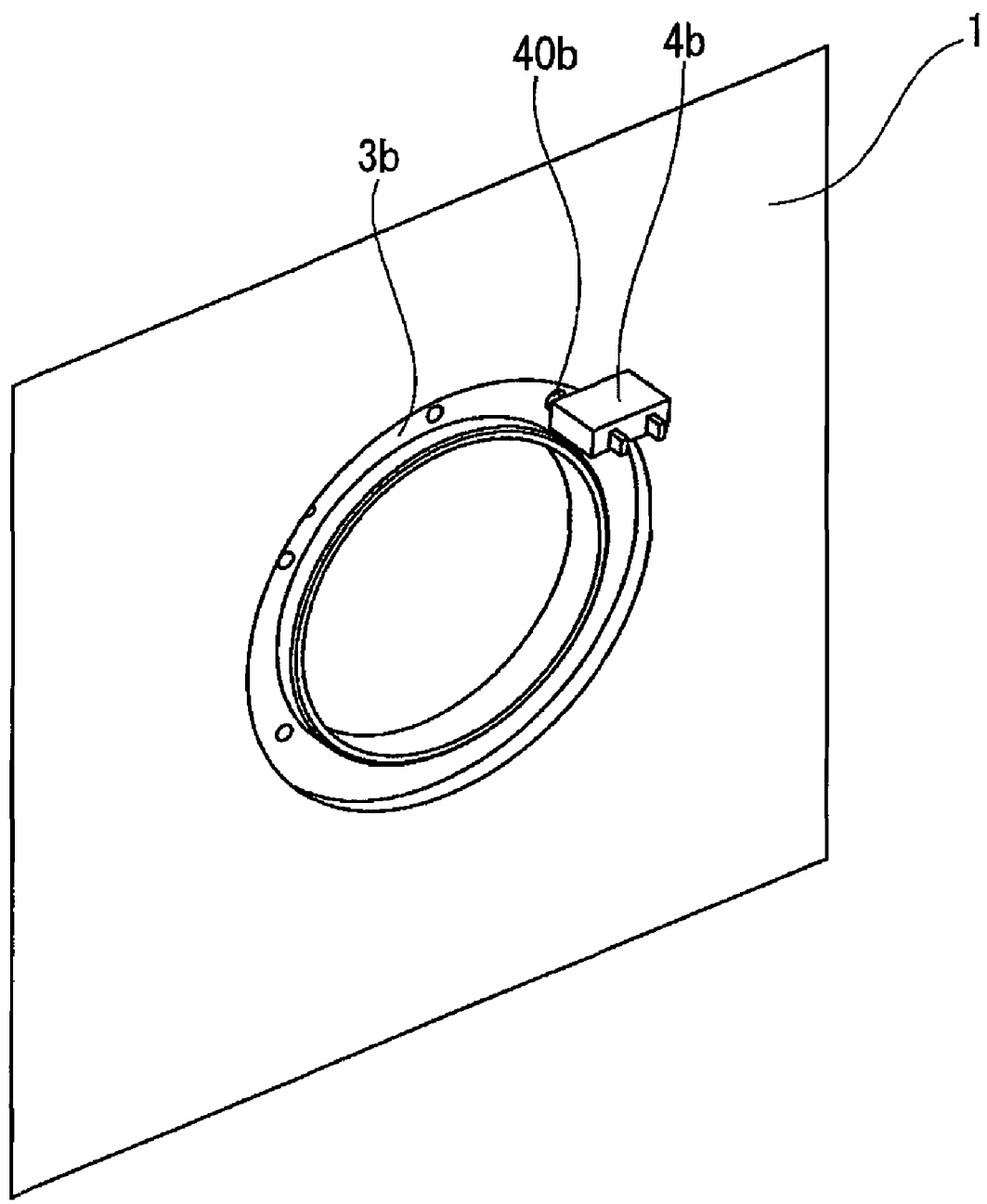
FIG. 4 is a perspective view that shows the constitution of the main portions of the image pickup device according to the first embodiment of the present invention.

First, a first embodiment of the present invention shall be described. FIG. 1 shows the overall constitution of the image pickup device by this embodiment, and FIGS. 2 to 5 show the constitution of the main portions of the image pickup device. An interchangeable lens 2 which can be attached and detached is connected to a main body 1 of an image pickup device. In the present embodiment, the interchangeable lens 2 shall be an interchangeable lens for a digital image pickup device. In FIG. 2, the illustration of the main body 1 is omitted. FIGS. 3 and 4 isolate one side face of the main body 1, with FIG. 3 showing the state of viewing the side face of the main body 1 from the outer side that is connected to the interchangeable lens 2 (the optical front side), and FIG. 4 showing the state of viewing the side face of the main body 1 from the inner side (the optical rear side).

As shown in FIG. 2, a lens connecting portion 3 is provided in order to connect the main body 1 and the interchangeable lens 2. The lens connecting portion 3 is constituted from lens connecting parts 3a and 3b. The lens connecting part 3a is fixed to the interchangeable lens 2, and the lens connecting part 3b is fixed to the main body 1. The interchangeable lens 2 is fixed to the main body 1 by these lens connecting parts 3a and 3b.

Figure 5:
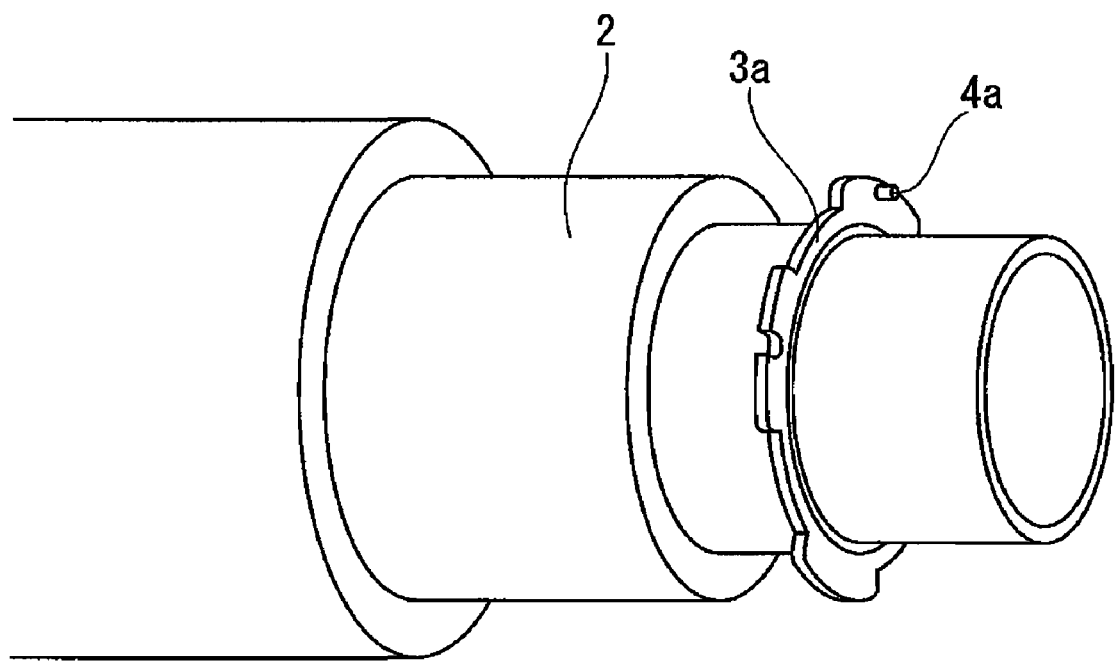
FIG. 5 is a perspective view that shows the constitution of the main portions of the image pickup device according to the first embodiment of the present invention.

As shown in FIG. 5, a protruding lens distinguishing part 4a that is constituted integrally with the lens connecting part 3a or as a separate member is provided in the lens connecting part 3a. Also, a lens distinguishing part 4b that is constituted as a press-in type switch is provided in the lens connecting part 3b as shown in FIG. 3 and FIG. 4. A press-in portion 40b that is a portion of the lens distinguishing part 4b is inserted in a through hole that is formed in the lens connecting part 3b, and in the state of the interchangeable lens 2 being connected to the main body 1, the lens distinguishing part 4a pushes the press-in portion 40b, whereby the lens distinguishing part 4b distinguishes the type of the interchangeable lens 2.

In the present embodiment, it is assumed that the lens distinguishing part 4a is not provided in an interchangeable lens for a film image pickup device. Accordingly in the case of the press-in portion 40b being pushed, the lens distinguishing part 4b can distinguish the interchangeable lens 2 that is connected to the main body 1 is an interchangeable lens for a digital image pickup device.

As shown in FIG. 2, an image pickup element 5, filter turrets 6 and 7, and an optical low-pass filter 12 are disposed to the optical rear side of the lens connecting part 3b. Pluralities of optical filters are mounted in the filter turrets 6 and 7. A plurality of neutral density (ND) filters 8 with different transmittances are mounted in the filter turret 6, and a plurality of color compensating (CC) filters 9 with different color temperatures are mounted in the filter turret 7. The optical path lengths of the ND filters 8 are completely equal, and the optical path lengths of the CC filters 9 are similarly all equal. Here, the optical path lengths being equal means that the product of the refraction index corresponding to the material of the member that constitutes an optical filter and the thickness of the optical filter is equal for each optical filter.

Opening portions 10, 11 where optical filters are not placed are respectively provided in the filter turrets 6, 7. Also, each of the filter turrets 6, 7 rotates about a rotation axis that passes through the center of each disk and is perpendicular to the disk surface by means of a rotation mechanism (not shown). The optical low-pass filter 12 is disposed between the filter turret 7 and the image pickup element 5.

The image pickup element 5 and the optical low-pass filter 12 are disposed to the optical rear side of the interchangeable lens 2 in the image pickup optical path when forming an image of an object on the image pickup element 5 with the interchangeable lens 2. The filter turrets 6, 7 are capable of disposing the ND filters 8, the CC filters 9, and the opening portions 10, 11 in the image pickup optical path via rotation. A signal processing portion 100 processes the image pickup signal that is output from the image pickup element 5.

Figure 6:
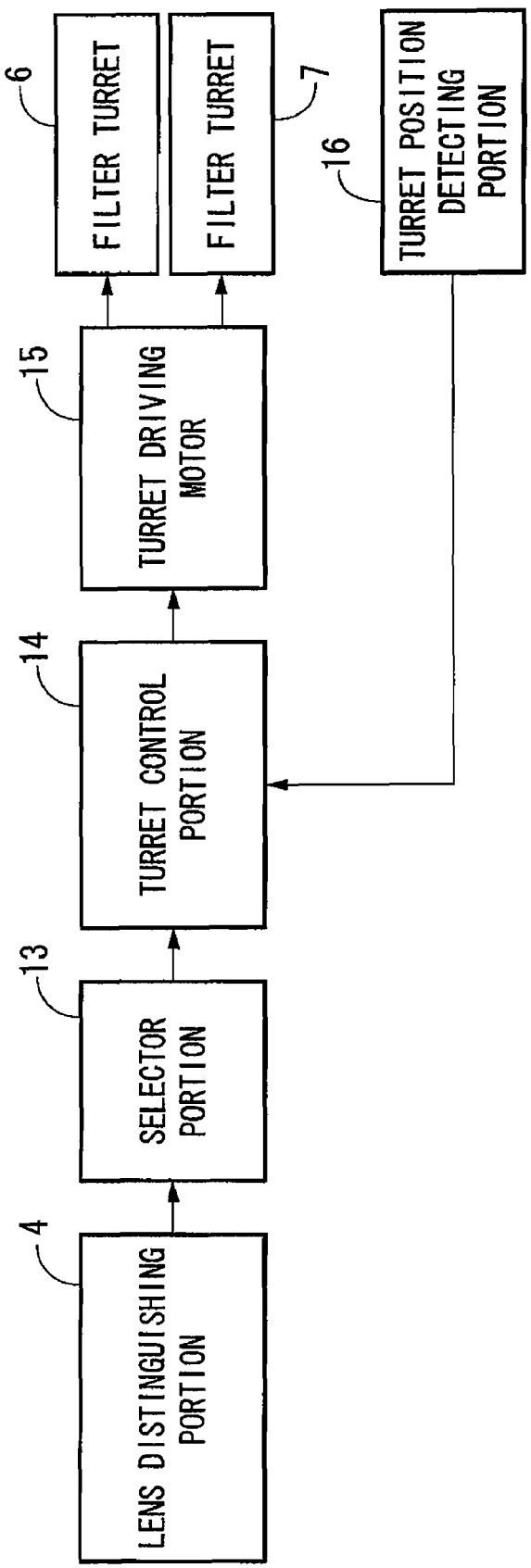
FIG. 6 is a block diagram that shows the constitution of the main portions of the image pickup device according to the first embodiment of the present invention.
Figure 7:
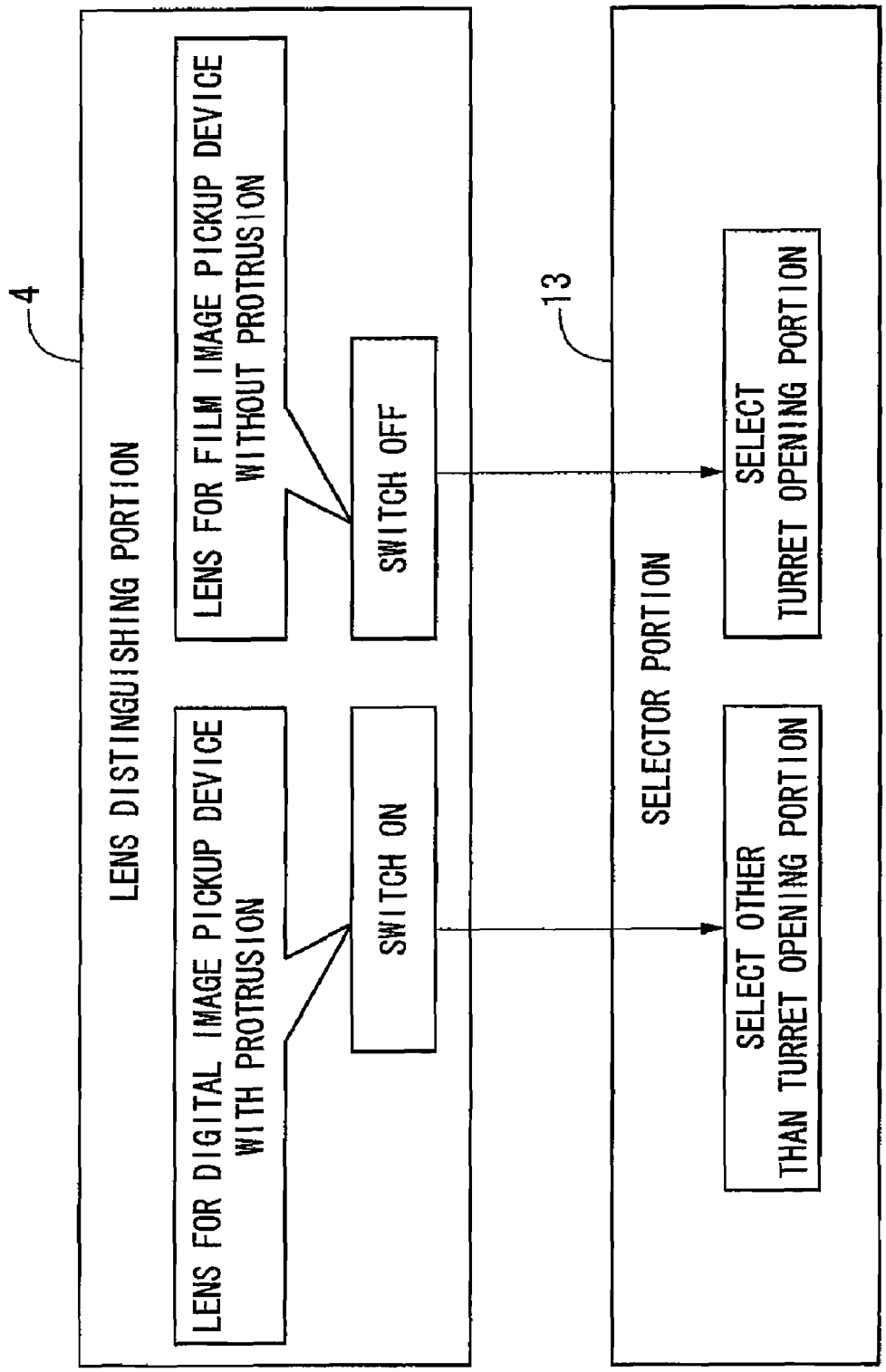
FIG. 7 is a reference drawing that shows the situation of selection by a selecting portion in the first embodiment of the present invention.

FIG. 6 shows only the constitution according to the rotation of the filter turrets 6, 7. A selector portion 13 selects the ND filter 8, the CC filter 9, and the opening portions 10, 11 to be disposed in the image pickup optical path in accordance with the determination result of the type of interchangeable lens by the lens distinguishing portion 4 that is constituted by the lens distinguishing parts 4a, 4b. FIG. 7 conceptually shows the appearance of selection by the selector portion 13. In the case of an interchangeable lens for a digital image pickup device being connected to the main body 1, and the switch of the lens distinguishing part 4b being ON, the selector portion 13 selects an optical filter other than the opening portions 10, 11. At this time, when there is a designation of the filter type by the user, the selector portion 13 selects the optical filter that has been designated by the user. In the case of an interchangeable lens for a film image pickup device being connected to the main body 1 and the switch of the lens distinguishing part 4b being OFF, the selector portion 13 selects the opening portions 10, 11.

A turret control portion 14 controls a turret driving motor 15 so that the selection by the selector portion 13 is disposed in the image pickup optical path. The turret driving motor 15 generates driving force that is supplied to the filter turrets 6, 7 and thus rotates the filter turrets 6, 7.

A turret position detecting portion 16 detects the rotation position of the filter turrets 6, 7 and reports that information to the turret control portion 14. Methods of detecting the rotation position of the filter turrets 6, 7 may include forming a projection on the circumference of the filter turrets 6, 7 and detecting the position of that projection with a photointerruptor, and directly measuring the rotation amount of the filter turrets 6, 7 with a combination of a stepping motor and an encoder.

Next, the operation of the constitution shown in FIG. 6 shall be described. In the state prior to attaching an interchangeable lens, since the switch of the lens distinguishing part 4b is OFF, the opening portions 10, 11 are selected by the turret control portion 14. The turret driving motor 15 rotates the filter turrets 6, 7 in accordance with the control by the turret control portion 14. The turret position detecting portion 16 reports the rotation position of the filter turrets 6, 7 to the turret control portion 14, and the turret control portion 14 controls the turret driving motor 15 so that the filter turrets 6, 7 stop at the desired rotation position. Thereby, the opening portions 10, 11 are disposed in the image pickup optical path.

When the photographer connects and fixes the interchangeable lens 2 for a digital image pickup device to the main body 1 of the image pickup device, the lens distinguishing part 4a pushes the press-in portion 40b of the lens distinguishing part 4b, and the switch of the lens distinguishing part 4b is turned ON. At this time, the selector portion 13 selects optical filters other than the opening portions 10, 11, and reports this selection to the turret control portion 14. Then, optical filters are disposed in the image pickup optical path by the same operation as previously described. In the case of using the interchangeable lens 2 for a digital image pickup device, since the interchangeable lens 2 is designed in consideration of the optical path length of the ND filter 8, the CC filter 9, and the optical low-pass filter 12, the image quality does not decrease even when optical filters are placed in the image pickup optical path. On the other hand, when the photographer connects and fixes the interchangeable lens 2 for a film image pickup device to the main body 1 of the image pickup device, since the press-in portion 40b of the lens distinguishing part 4b is not pushed, the state of the opening portions 10, 11 being disposed in the image pickup optical path does not change.

In the present embodiment, it is assumed that the lens distinguishing part 4a is provided in an interchangeable lens for a digital image pickup device, and the lens distinguishing part 4a is not provided in an interchangeable lens for a film image pickup device, however, the opposite may also be the case. Also, the example was described of optical filters being mounted in the filter turrets 6, 7, and the filter turrets 6, 7 being constituted to rotate, but a constitution is also possible in which the optical filters move in straight line within a plane that is parallel to the image pickup surface of the image pickup element 5.

As stated above, according to the present embodiment, it is possible to selectively dispose an optical filter in the image pickup optical path or outside of the image pickup optical path in accordance with the type of interchangeable lens (for a digital image pickup device or a film image pickup device). For example, in the case of an interchangeable lens for a digital image pickup device being connected, any the optical filters are disposed in the image pickup optical path. Also, in the case of an interchangeable lens for a film image pickup device being connected, the optical filters are disposed at a position other than in the image pickup optical path, and the opening portions 10, 11 are disposed in the image pickup optical path. Accordingly, it is possible to use both an interchangeable lens for a film image pickup device and an interchangeable lens for a digital image pickup device, and possible to reduce a decrease in image quality.

Second Embodiment

Figure 8:
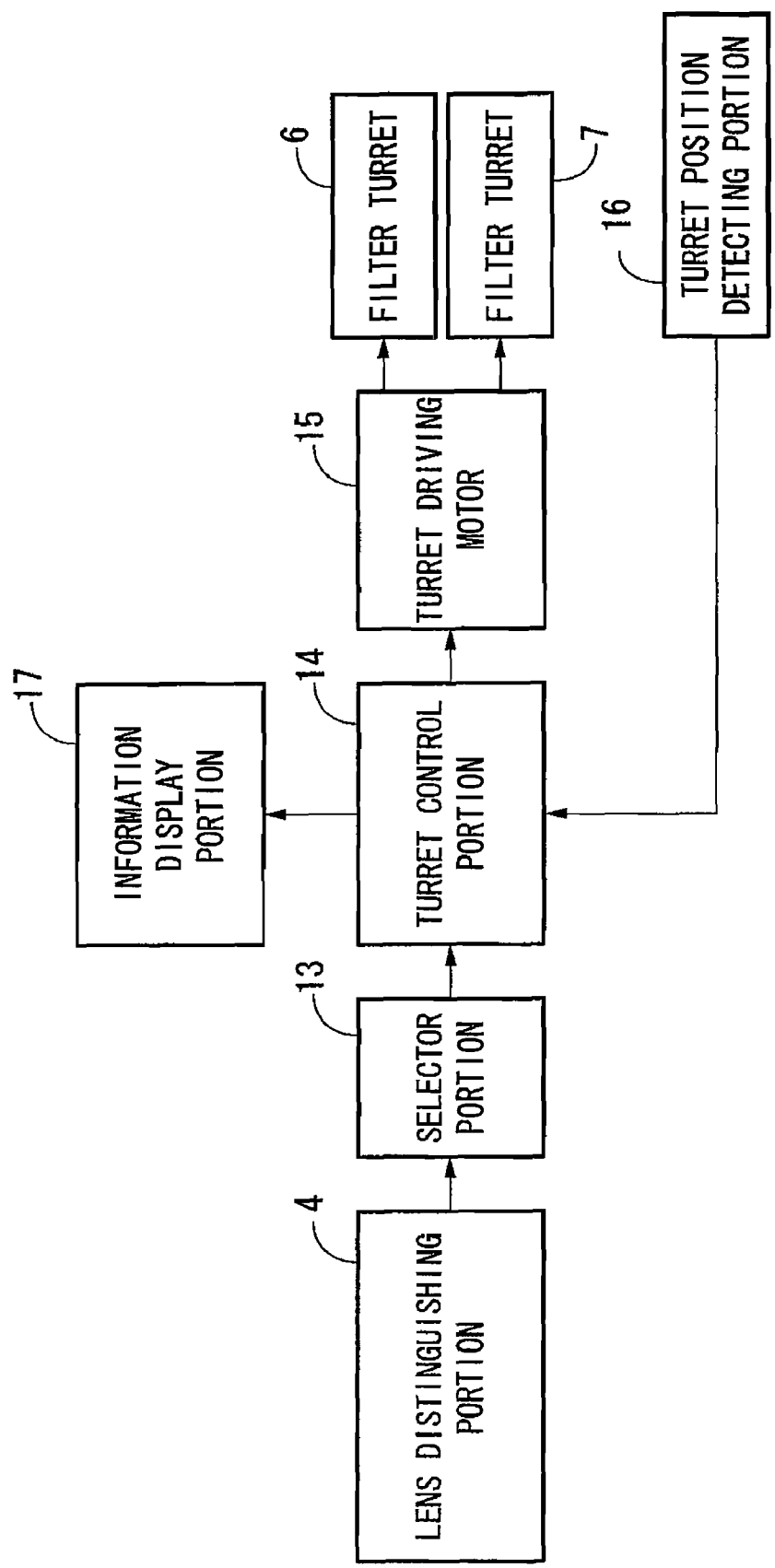
FIG. 8 is a block diagram that shows the constitution of the main portions of the image pickup device according to a second embodiment of the present invention.

Next, a second embodiment of the present invention shall be described. FIG. 8 shows the constitution of the image pickup device of the present embodiment. FIG. 8, similarly to FIG. 6, shows only the constitution according to the rotation of the filter turrets 6, 7. In the present embodiment, an information display portion 17 is provided, for example, on the side surface of the main body 1.

The information display portion 17 displays information of the optical filters or the opening portions 10, 11 that are disposed in the image pickup optical path.

In the case of the opening portions 10, 11 in which optical filters are not placed being disposed in the image pickup optical path, the information display portion 17 displays information showing that the opening portions 10, 11 have been selected. Also, in the case of an optical filter being disposed in the image pickup optical path, if the optical filter is an ND filter 8, the information display portion 17 displays the message "Transmittance xx %", and if the optical filter is a CC filter 9, the information display portion 17 displays the message "Color temperature xxK".

By displaying information of the optical filter or the opening portions 10, 11 as in the present embodiment, the photographer can readily confirm the current state of the image pickup device.

Third Embodiment

Figure 9:
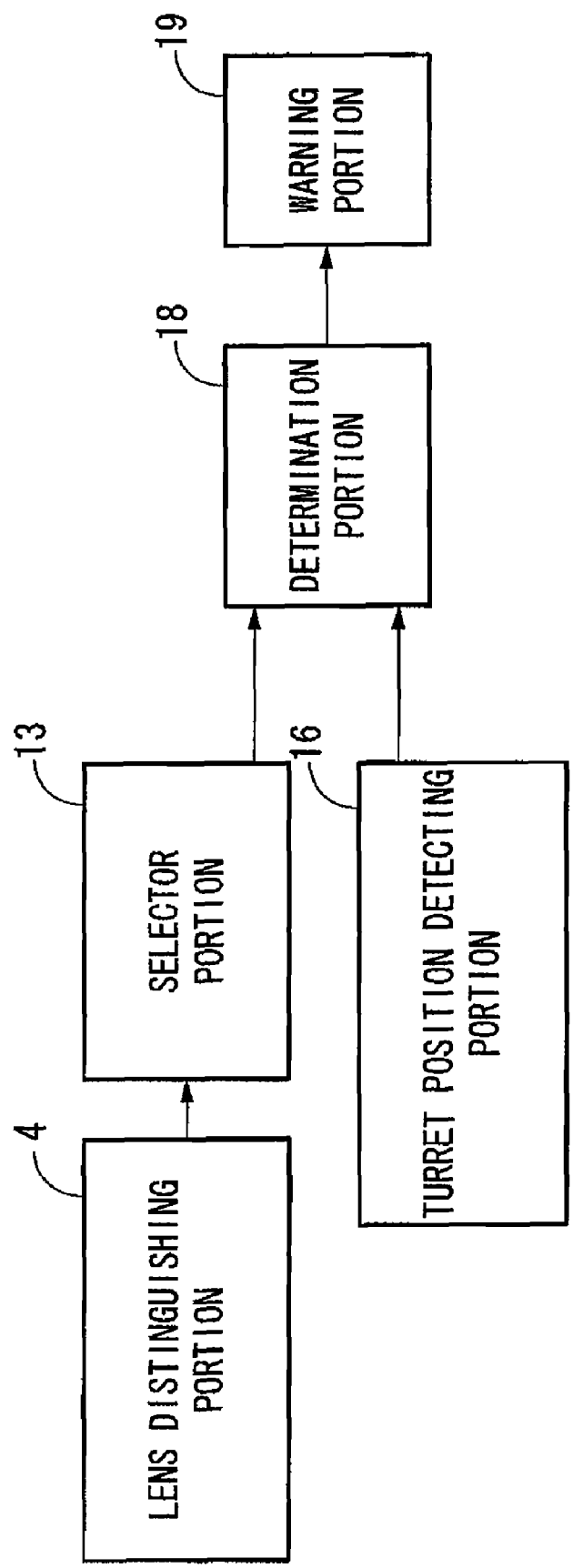
FIG. 9 is a block diagram that shows the constitution of the main portions of the image pickup device according to a third embodiment of the present invention.

Next, a third embodiment of the present invention shall be described. FIG. 9 shows the constitution of the image pickup device according to the present embodiment. FIG. 9, similarly to FIG. 6 and the like, shows only the constitution according to the rotation of the filter turrets 6, 7. In the present embodiment, a determination portion 18 and a warning portion 19 are provided. Also, in the present embodiment, it is assumed that the photographer can designate the stopping position of the filter turrets 6, 7.

The determination portion 18 determines whether or not that which is disposed in the image pickup optical path (ND filter 8, CC filter 9, opening portions 10, 11) correspond to the type of interchangeable lens based on the determination result of the type of interchangeable lens by the lens distinguishing portion 4 and the stopping position of the filter turrets 6, 7 detected by the turret position detecting portion 16. In the case of the opening portions 10, 11 being disposed in the image pickup optical path for all that the interchangeable lens 2 for a digital image pickup device is connected, and in the case of the ND filter 8 or the CC filter 9 being disposed in the image pickup optical path for all that the interchangeable lens for a film image pickup device is connected, the determination portion 18 reports the occurrence of an anomaly to the warning portion 19. The warning portion 19 generates a warning in the case of an anomaly being reported from the determination portion 18. The method of warning may be any kind of method, and may for example consist of displaying a warning letter or sounding a warning beep.

By generating a warning in the case of the optical filter or opening portion that is disposed in the image pickup optical path not corresponding to the type of interchangeable lens as in the present embodiment, it is possible to prevent a decrease in image quality due to a setting error of the state of the image pickup device.

Fourth Embodiment

Figure 10:
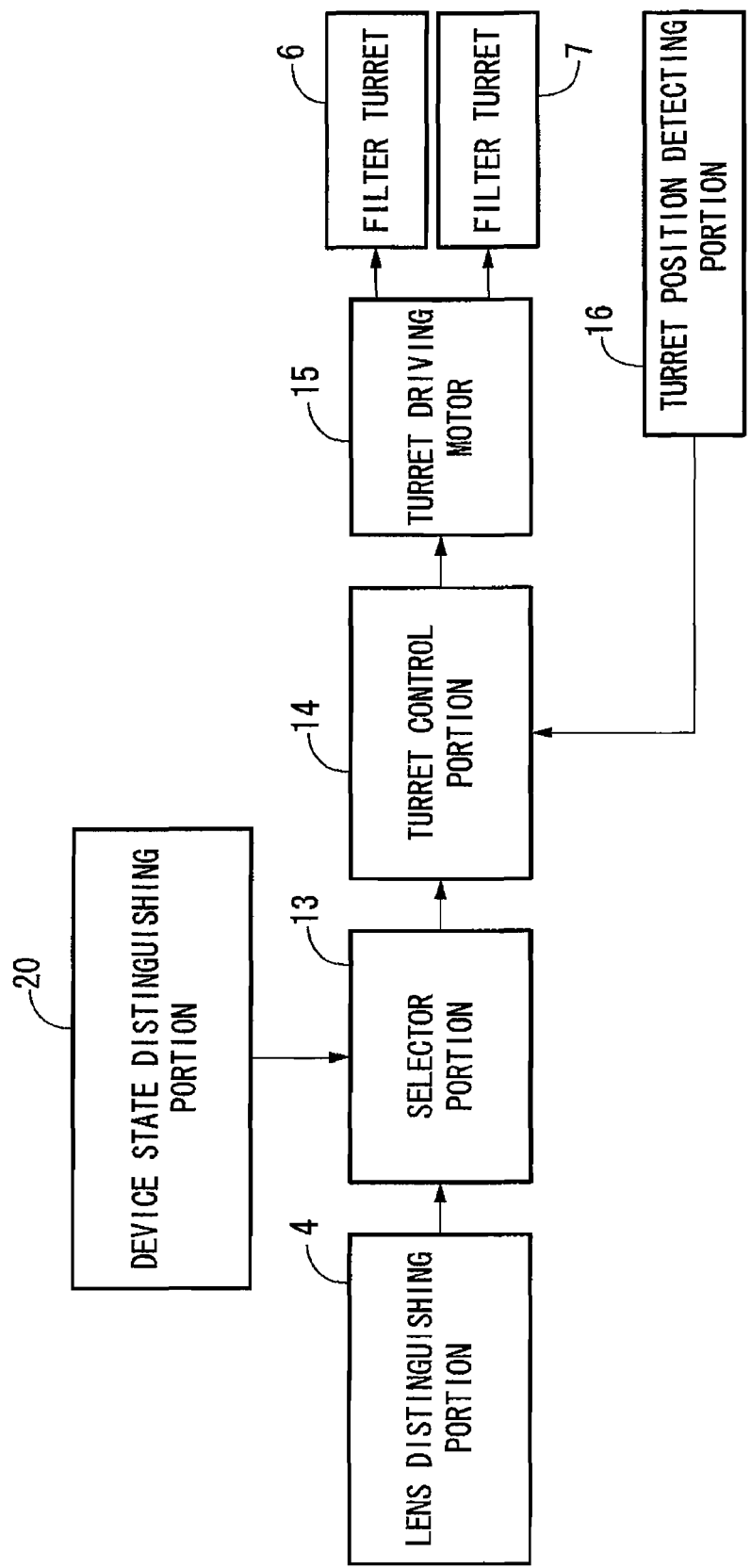
FIG. 10 is a block diagram that shows the constitution of the main portions of the image pickup device according to a fourth embodiment of the present invention.

Next, a fourth embodiment of the present invention shall be described. FIG. 10 shows the constitution of the image pickup device according to the present embodiment. FIG. 10, similarly to FIG. 6 and the like, shows only the constitution according to the rotation of the filter turrets 6, 7. A device state distinguishing portion 20 is provided in the present embodiment. The device state distinguishing portion 20 distinguishes whether the state of the image pickup device is ON (the state of driving power being supplied from the power supply) or OFF (the state of the supply of driving power from the power supply being stopped).

Figure 11:
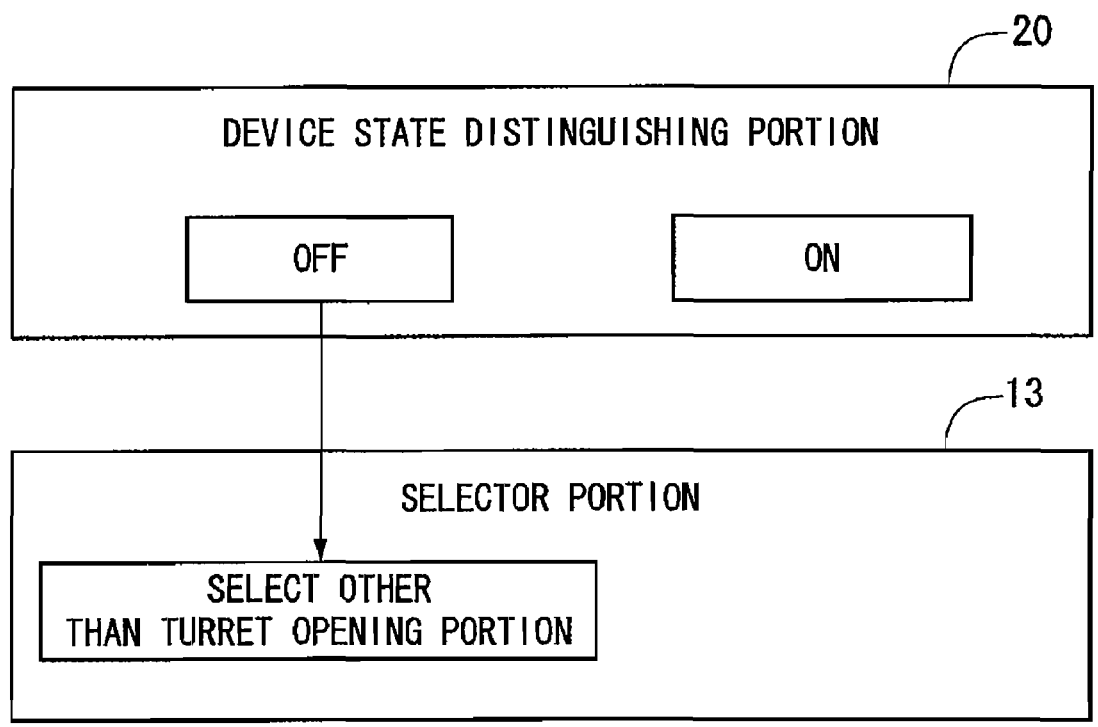
FIG. 11 is a reference drawing that shows the situation of selection by a selecting portion in the fourth embodiment of the present invention.

FIG. 11 conceptually shows the appearance of selection by the selector portion 13. In the case of the device state distinguishing portion 20 distinguishing that the state of the image pickup device is set to ON, the determination result does not particularly exert an effect on the operation of the image pickup device. On the other hand, in the case of the photographer switching the power switch to the OFF side in order to change the lens, the device state distinguishing portion 20 distinguishes that the state of the image pickup device is set to OFF. Upon receiving this determination result, the turret control portion 14 executes control that rotates the filter turrets 6, 7 so that any optical filter other than the opening portions 10, 11 is disposed in the image pickup optical path. Accordingly, when the power supply of the image pickup device is OFF, a state arises of any optical filter other than the opening portions 10, 11 being disposed in the image pickup optical path.

Since lens changing is performed when the state of the image pickup device is OFF, it is possible to prevent dust from intruding and settling in the vicinity of the optical low pass filter 12 or the image pickup element 5 during lens changing according to the present embodiment.

Fifth Embodiment

Figure 12:
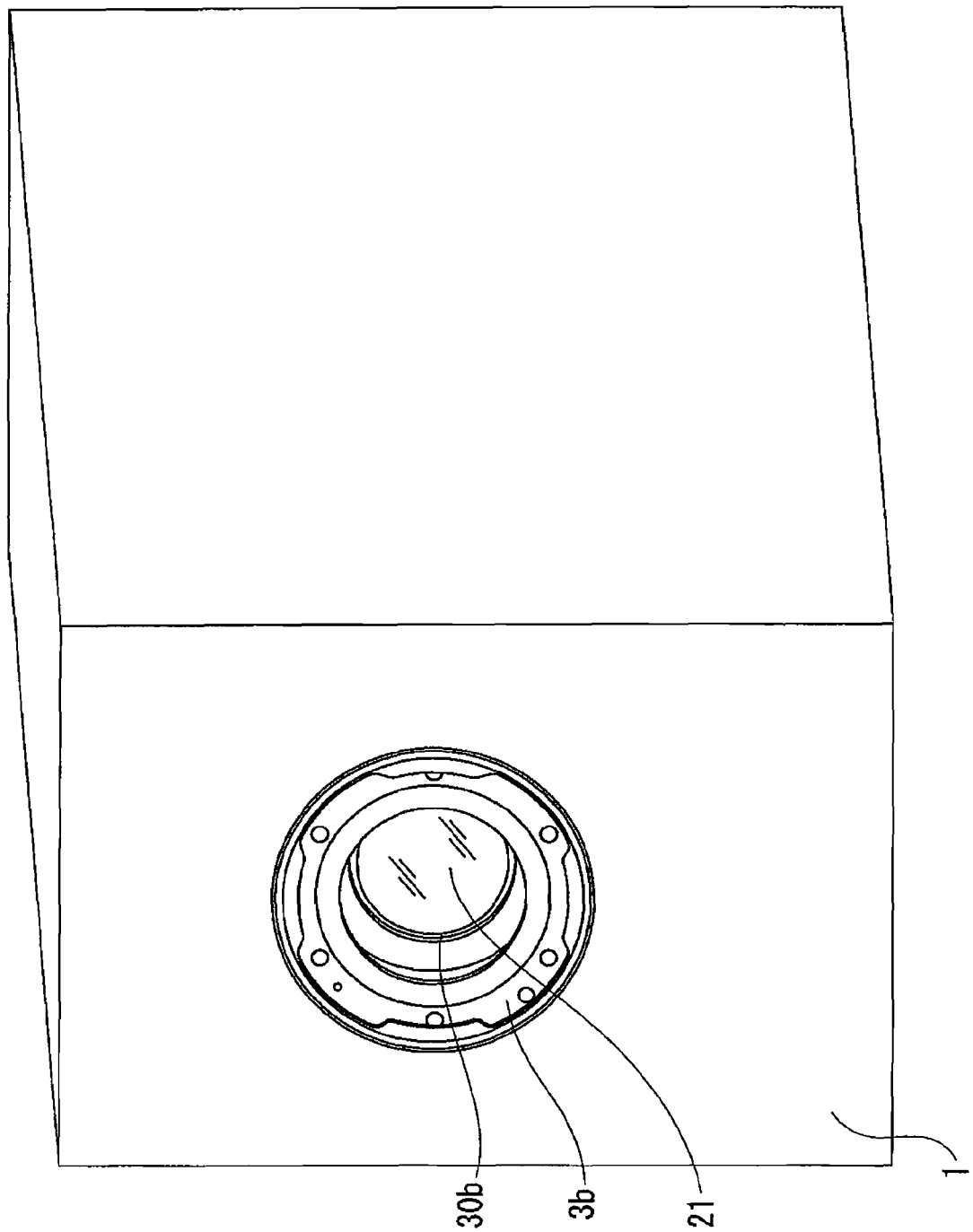
FIG. 12 is a perspective view that shows the constitution of the main portions of the image pickup device according to the fifth embodiment of the present invention.

Next, a fifth embodiment of the present invention shall be described. FIG. 12 shows the constitution of the main portions of the image pickup device according to the present embodiment. An IR-cut filter 21 that blocks an opening portion 30b of the lens connecting part 3b is disposed in the present embodiment. This IR-cut filter 21 serves as a lid of the main body 1, and so it can prevent dust from entering the interior of the image pickup device when changing lenses.

Sixth Embodiment

Figure 13:
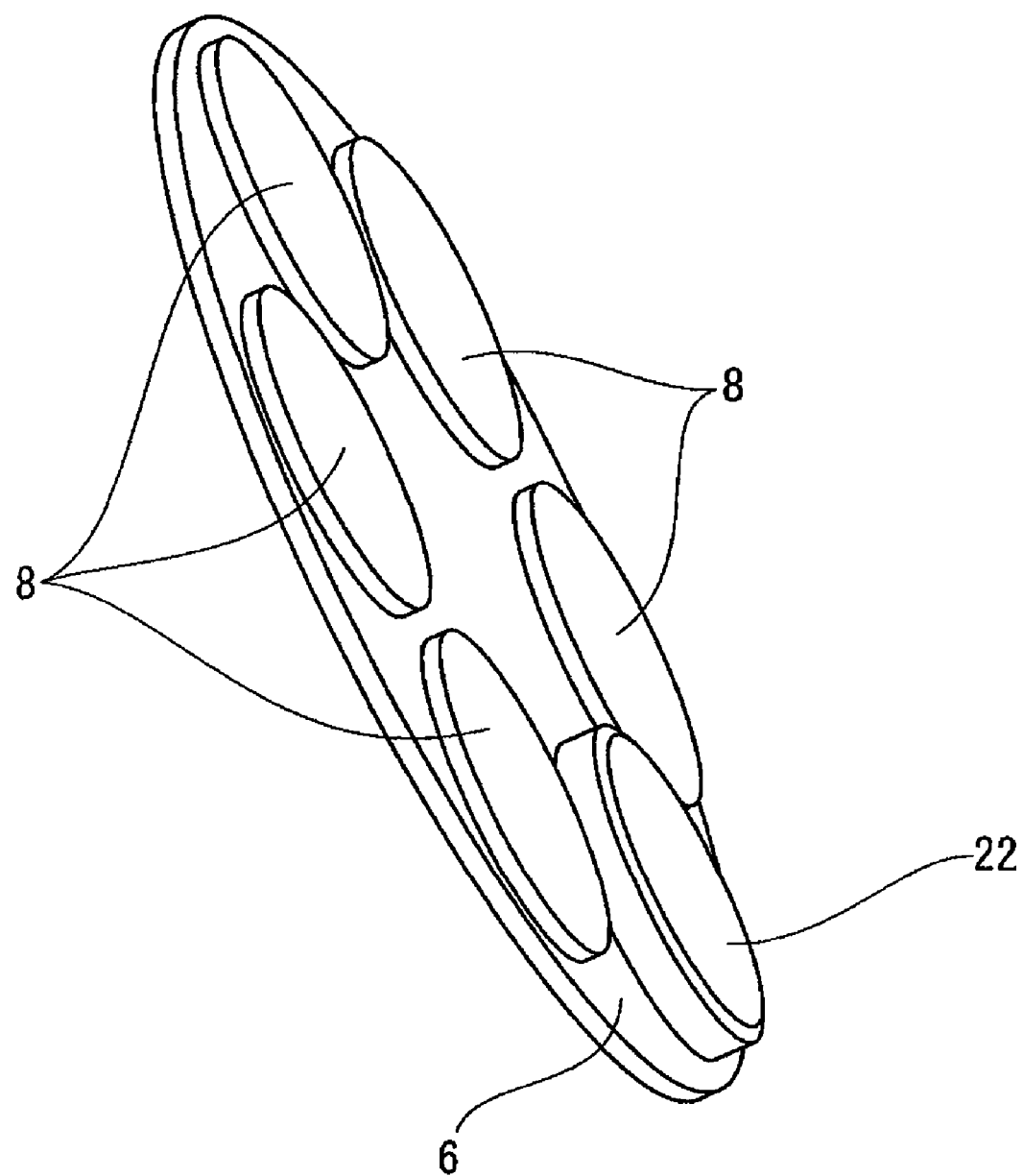

Next, a sixth embodiment of the present invention shall be described. FIG. 13 shows the constitution of only the filter turret 6 in the image pickup device according to the present embodiment. In the present embodiment, a correcting lens 22 is provided instead of the opening portion 10 of the filter turret 6 in the first to fifth embodiments. The correcting lens 22 may also be provided in the filter turret 7. In the case of an interchangeable lens for a film image pickup device being connected, the correcting lens 22 is disposed in the image pickup optical path in accordance with the control by the turret control portion 14. According to the present embodiment, in the case of using an interchangeable lens for a film image pickup device, it is possible to correct a slight decrease in image quality due to the optical low pass filter 12 and so prevent a decrease in image quality.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

According to the present invention, since it is possible to selectively dispose an optical filter in the image pickup optical path or outside of the image pickup optical path in accordance with the type of interchangeable lens, it is possible to use both an interchangeable lens for a film image pickup device and an interchangeable lens for a digital image pickup device, and possible to reduce a decrease in image quality.

What is claimed is:

1. An image pickup device that picks up an image of an object with an image pickup element, comprising:
   a lens connecting portion that connects an interchangeable lens that can be attached and detached;
   a lens distinguishing portion that distinguishes the type of the interchangeable lens that is connected to the lens connecting portion;
   a plurality of optical filters that are capable of being disposed to the optical rear side of the interchangeable lens in the image pickup optical path when picking up an image of an object on the image pickup element with the interchangeable lens; and
   a moving portion that moves at least any of the plurality of optical filters to a position that corresponds to the type of the interchangeable lens that the lens distinguishing portion has distinguished.

2. The image pickup device according to claim 1, wherein the plurality of optical filters are disposed in a disk-shaped rotating turret.

3. The image pickup device according to claim 2, wherein the rotating turret has an opening portion.

4. The image pickup device according to claim 3, wherein a plurality of neutral density filters with different transmittances are disposed at other than the opening portion of the rotating turret.

5. The image pickup device according to claim 4, wherein the optical path lengths of the plurality of neutral density filters are all equal.

6. The image pickup device according to claim 3, wherein a plurality of color compensating filters with different color temperatures are disposed at other than the opening portion of the rotating turret.

7. The image pickup device according to claim 6, wherein the optical path lengths of the plurality of color compensating filters are all equal.

8. The image pickup device according to claim 3, wherein the moving portion:
   rotates the rotating turret so that the opening portion is disposed in the image pickup optical path when the lens distinguishing portion distinguishes the type of the interchangeable lens to be an interchangeable lens for a film image pickup device, and
   rotates the rotating turret so that any of the plurality of optical filters is disposed in the image pickup optical path when the lens distinguishing portion distinguishes the type of the interchangeable lens to be an interchangeable lens for a digital image pickup device.

9. The image pickup device according to claim 3, further comprising a device state distinguishing portion that distinguishes whether the state of the image pickup device is set to ON or OFF;
   wherein the moving portion rotates the rotating turret so that any of the plurality of optical filters is disposed in the image pickup optical path when the device state distinguishing portion distinguishes that the state of the image pickup device has been set to OFF.

10. The image pickup device according to claim 1, further comprising a display portion that displays information of the optical filter that is disposed in the image pickup optical path.

11. The image pickup device according to claim 1, further comprising a warning portion that issues a warning when the optical filter that is disposed in the image pickup optical path does not correspond to the type of the interchangeable lens that the lens distinguishing portion has distinguished.

12. The image pickup device according to claim 1, further comprising an IR-cut filter that blocks an opening of the lens connecting portion.

13. The image pickup device according to claim 2, wherein a correcting lens is additionally disposed in the rotating turret.

* * * * *